(12) United States Patent
Bublitz et al.

(10) Patent No.: US 12,146,740 B2
(45) Date of Patent: Nov. 19, 2024

(54) METHOD AND SYSTEM FOR MEASURING A SURFACE TOPOGRAPHY OF AN OBJECT

(71) Applicant: Carl Zeiss Industrielle Messtechnik GmbH, Oberkochen (DE)

(72) Inventors: Daniel Bublitz, Rausdorf (DE); Peter Westphal, Jena (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 235 days.

(21) Appl. No.: 17/998,599

(22) PCT Filed: May 12, 2021

(86) PCT No.: PCT/EP2021/062655
§ 371 (c)(1),
(2) Date: Nov. 13, 2022

(87) PCT Pub. No.: WO2021/228959
PCT Pub. Date: Nov. 18, 2021

(65) Prior Publication Data
US 2023/0204339 A1    Jun. 29, 2023

(30) Foreign Application Priority Data
May 14, 2020    (DE) ............... 10 2020 113 159.3

(51) Int. Cl.
*G01B 9/021*    (2006.01)
*G01B 9/02*    (2022.01)
*G01B 11/30*    (2006.01)

(52) U.S. Cl.
CPC ......... *G01B 9/021* (2013.01); *G01B 9/02094* (2013.01); *G01B 11/303* (2013.01)

(58) Field of Classification Search
CPC .. G01B 9/021; G01B 9/02094; G01B 11/303; G01B 2290/60; G01B 9/02047; G01B 9/02003; G01B 9/02005; G01B 9/02007
See application file for complete search history.

(56) References Cited

U.S. PATENT DOCUMENTS 3,818,372 A    6/1974    Wuerker et al.
6,262,818 B1 *   7/2001    Cuche ............... G03H 1/0866
                                                    359/9

(Continued)

FOREIGN PATENT DOCUMENTS

DE            195 22 263 A1    1/1997
DE      10 2008 020 584 B3    9/2009

(Continued)

OTHER PUBLICATIONS

Willomitzer, Florian, et al., "Synthetic Wavelength Holography: An Extension of Gabor's Holographic Principle to Imaging with Scattered Wavefronts," ARVIX.org. Cornell University Library, arXix:1912.11438, XP081820724, pp. 1-3 (Dec. 24, 2019).

(Continued)

*Primary Examiner* — Jonathan M Hansen
(74) *Attorney, Agent, or Firm* — Christensen, Fonder, Dardi & Herbert PLLC

(57) ABSTRACT

A method for measuring the surface topography of an object including the following steps: a) providing source radiation and dividing the source radiation into illumination radiation and reference radiation, b) illuminating the surface of the object with illumination radiation in a planar illumination field, the surface of the object being illuminated simultaneously with more than one spatial radiation mode and the radiation modes of the illumination being spatially and temporally coherent, but with a fixed phase difference from one another, and c) overlaying the reference radiation on illumination radiation back-scattered at the surface of the (Continued)

object, and detecting an interference signal of the overlaid radiation with a detector. Steps a) to c) are carried out for at least two different, fixed wavelengths. The surface topography of the object is determined by means of digital holography.

26 Claims, 6 Drawing Sheets

(56) References Cited

U.S. PATENT DOCUMENTS

| | | | |
|---|---|---|---|
| 10,244,940 B2 | 4/2019 | Bublitz et al. | |
| 10,568,503 B2 | 2/2020 | Bublitz et al. | |
| 11,064,879 B2 | 7/2021 | Bublitz | |
| 2010/0253986 A1* | 10/2010 | Awatsuji | G03H 1/0443 359/10 |
| 2013/0100333 A1* | 4/2013 | Awatsuji | G01N 21/21 348/335 |
| 2014/0028974 A1 | 1/2014 | Tumlinson | |
| 2015/0268628 A1* | 9/2015 | Sato | G01B 9/02091 356/457 |
| 2017/0224208 A1* | 8/2017 | Bublitz | G01B 9/02032 |
| 2018/0011022 A1* | 1/2018 | Tahara | G03H 1/265 |
| 2018/0020912 A1 | 1/2018 | Bublitz et al. | |
| 2019/0056214 A1 | 2/2019 | Everett et al. | |
| 2019/0380573 A1 | 12/2019 | Bublitz | |
| 2020/0174425 A1* | 6/2020 | Georges, III | G03H 1/0866 |

FOREIGN PATENT DOCUMENTS

| | | |
|---|---|---|
| DE | 10 2014 115 153 A1 | 4/2016 |
| DE | 10 2014 115 155 A1 | 4/2016 |
| DE | 10 2014 115 157 A1 | 4/2016 |
| DE | 10 2015 101 251 A1 | 7/2016 |
| DE | 10 2018 130 396 A1 | 12/2019 |
| WO | WO 2016/120401 A1 | 8/2016 |
| WO | WO 2017/137567 A1 | 8/2017 |

OTHER PUBLICATIONS

Vandenrijt, Jean-François, et al., "Long-wave infrared digital holographic interferometry with diffuser or point source illuminations for measuring deformations of aspheric mirrors," *Optical Engineering*, vol. 53, No. 11, pp. 112309-1-112309-6 (Nov. 2014).

Silva, D.M., et al., "Simple and versatile heterodyne whole-field interferometer for phase optics characterization," *Review of Scientific Instruments*, vol. 83, pp. 103103-1-103103-7 (2012).

Kakue, Takashi, et al., "Parallel Phase-Shifting Digital Holography Capable of Simultaneously Capturing Visible and Invisible Three-Dimensional Information," *Journal of Display Technology*, vol. 6, No. 10, pp. 472-478 (Oct. 2010).

Lédl, Vít, et al., "Challenges in holographic measurement of aspheric and freeform optical components shape," *Proc. of SPIE*, vol. 9508, 10 pages (May 2015).

Kumar, Abhishek, et al., "Subaperture correlation based digital adaptive optics for full field optical coherence tomography," *Optics Express*, vol. 21, No. 9, 17 pages (May 6, 2013).

Hillmann, Dierck, et al., "Efficient holoscopy image reconstruction," *Optics Express*, vol. 20, No. 19, 17 pages (Sep. 10, 2012).

\* cited by examiner

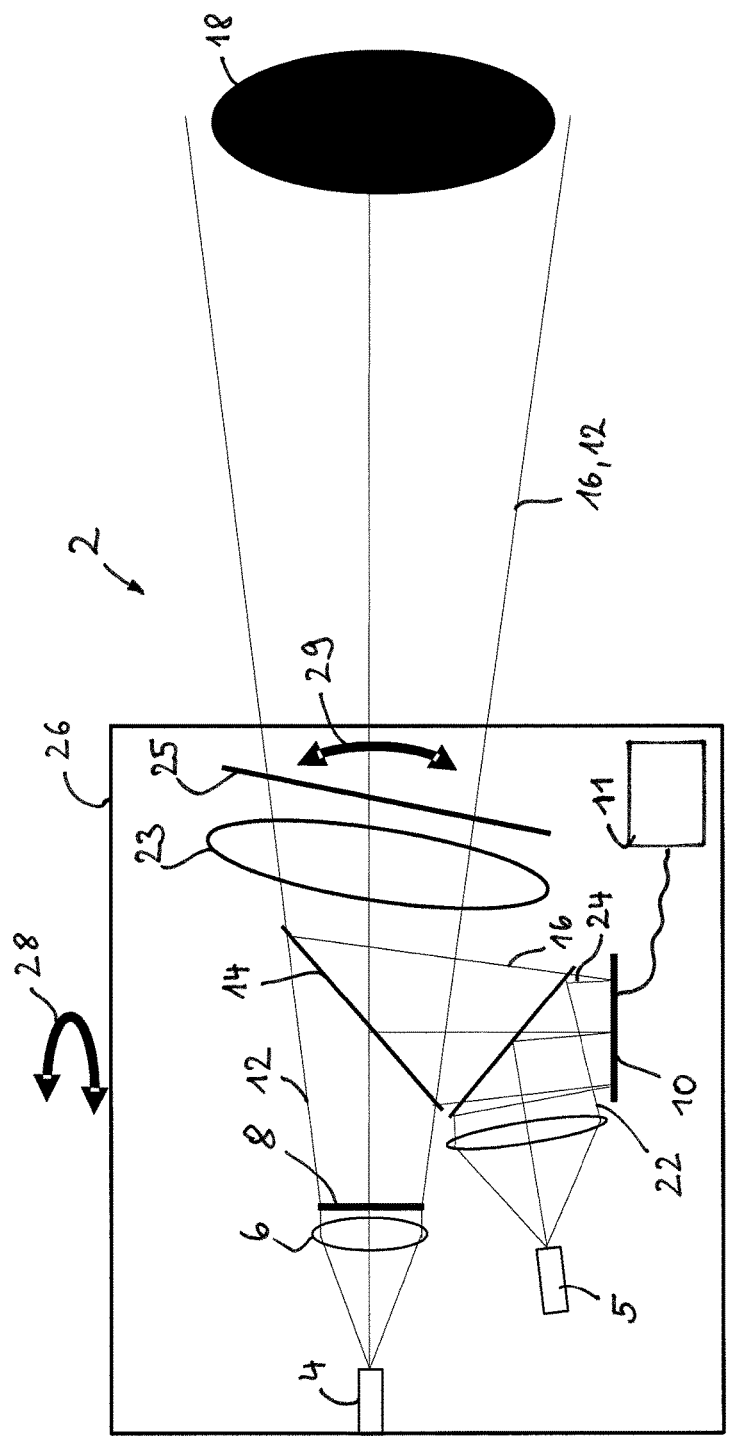
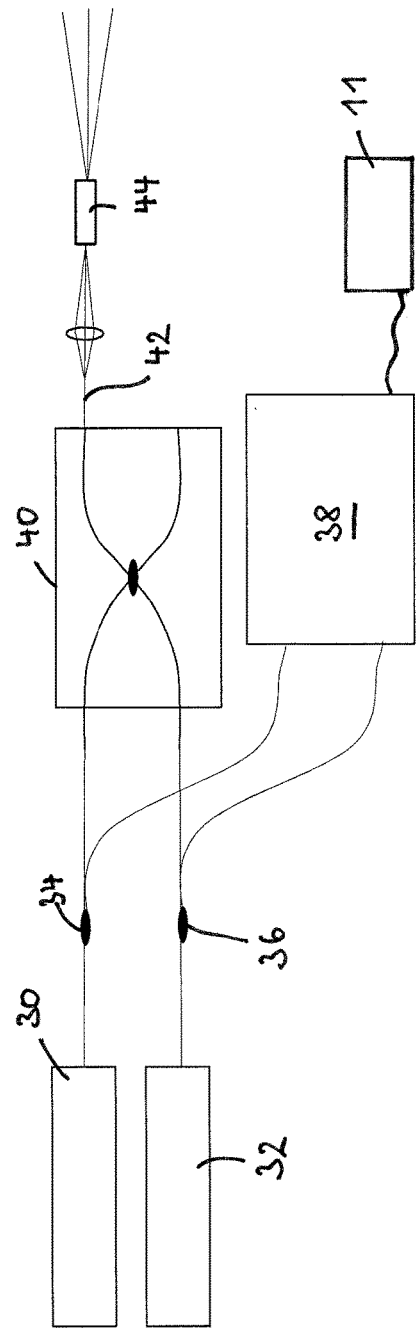
FIG. 1B
FIG. 2

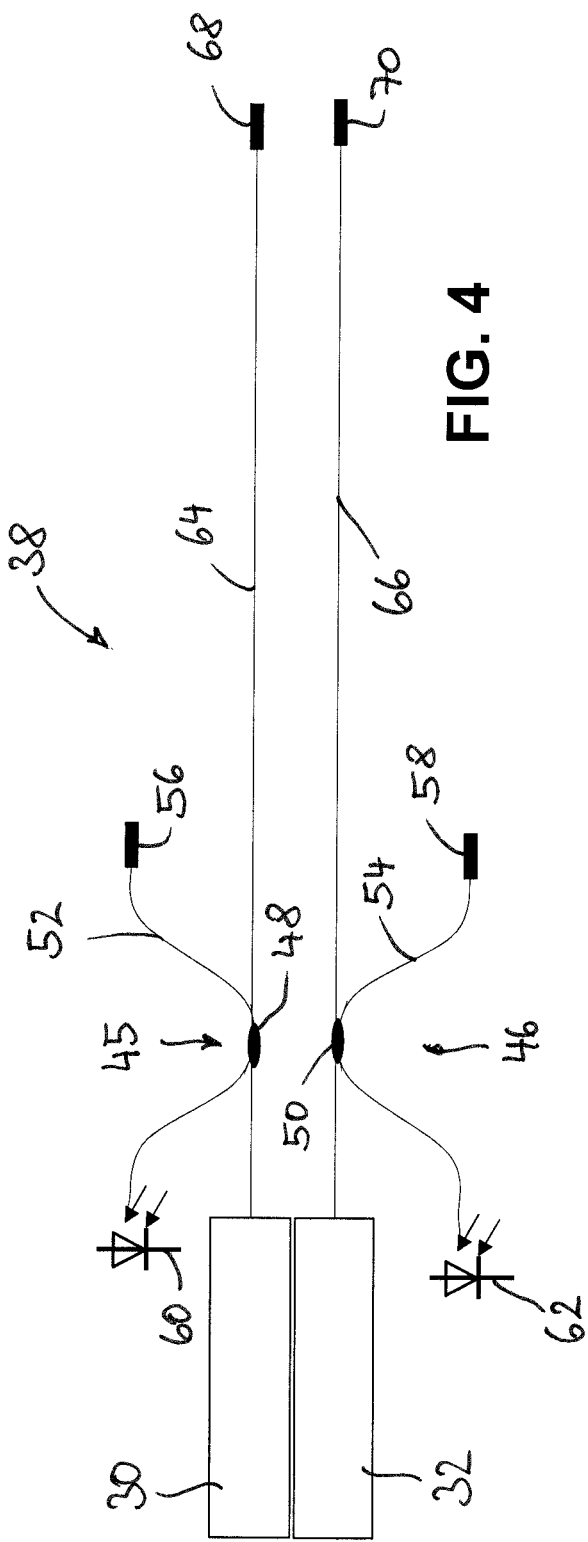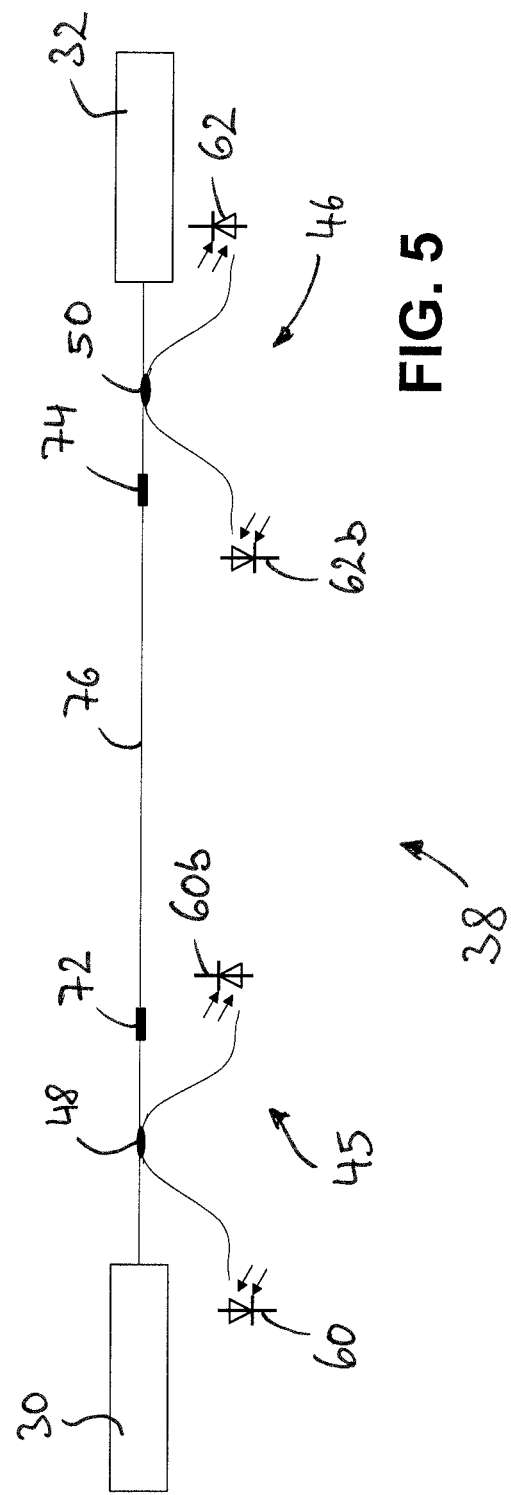

METHOD AND SYSTEM FOR MEASURING A SURFACE TOPOGRAPHY OF AN OBJECT

PRIORITY CLAIM

The present application is a National Phase entry of PCT Application No. PCT/EP2021/062655, filed May 12, 2021, which claims priority from German Patent Application 10 2020 113 159.3, filed May 14, 2020, the disclosures of which are hereby incorporated by reference herein in their entirety.

FIELD OF THE INVENTION

The invention relates to measuring the surface topography of an object, in particular a large object.

BACKGROUND OF THE INVENTION

One established method for the 3D surveying of the surface configuration of technical specimens is digital holography according to DE 10 2008 020 584 A1. As is usual in topography methods, the light of a pixel returns from a defined distance, namely from the surface of the measurement object. For the holography, a plurality of images are recorded, each at a different (fixed) wavelength. A maximum of a few hundred dedicated wavelengths is usual.

DE 10 2018 130 396 A1 describes a method of optical coherence tomography. The described method is used for volume imaging on the human eye. Unlike in the 3D surveying of the object configuration, the tomography acquires volume scattering inside the sample with depth resolution, i.e. light from all depths of the object is scattered back simultaneously for a pixel. For the depth resolution, in tomography methods the wavelength of the illumination light is therefore tuned. During this, many records of the specimen are taken. The depth configuration of the specimen is reconstructed by a Fourier transform via the reciprocal wavelength. In order to be able to distinguish for example 10000 different depths of the object, 20000 records are generally recorded and calculated. Optical coherence tomography is therefore generally slower than digital holography, but achieves a depth resolution. For pure surface objects, however, it would be too slow.

Like optical coherence tomography, digital holography is based on the object being illuminated with a fully spatially coherent wave. For this purpose, in the prior art collimated or spherical TEM00 modes are shined in. So that this illumination wave does not entail any risk for the eyes of human viewers, either these instruments are used in inaccessible measurement rooms or only very low illumination powers in the milliwatt range may be employed. DE 10 2018 130 396 A1 shines a scattered fully coherent illumination wave into the eye.

SUMMARY OF THE INVENTION

The object of the invention is to provide a system and a method for measuring a topography of a surface, which operates with laser class 1 according to the standard EN 60825-1 in the version in force on 1.1.2020 but also uses comparatively higher powers in the range of from 0.1 to 10 W and can nevertheless record large objects in volumes measuring up to 150 m³ in rooms accessible by humans without movement artefacts.

The invention is defined in the independent claims. The dependent claims relate to preferred refinements.

A digital multifrequency holography system and method are provided, which use a fully coherent but scattered illumination wave. The possibilities described in DE 10 2018 130 396 A1 may be used for the illumination. The signal evaluation is carried out in a similar way to DE 10 2008 020 584 A1.

In the method for measuring the surface topography of an object, source radiation is provided and is split into illumination radiation and reference radiation. The surface of the object is illuminated with the illumination radiation at a two-dimensionally extended illumination field. In this case, the surface is illuminated simultaneously with more than one spatial radiation mode. The radiation modes of the illumination are spatially and temporally coherent with one another but have a fixed phase difference from one another. Illumination radiation scattered back at the surface of the object is superimposed with the reference radiation and then received by a detector. An interference signal of the superimposed radiations is thus obtained by the detector. This is carried out for at least two different fixed wavelengths and the surface topography of the object is determined by means of digital holography evaluation, then.

Further, a system for measuring a surface topography of an object, that is to say a surface topometer, which is configured to carry out this method is provided. It comprises an illumination device for providing the source radiation at least at two different fixed wavelengths, a splitting element for splitting the source radiation into illumination radiation and reference radiation, and a scattering element. This prepares the illumination radiation in such a way that the radiation having traveled through the scattering element provides a two-dimensionally extended illumination field for illuminating the object, which field comprises more than one spatial radiation mode, the radiation modes being spatially and temporally coherent with one another but having a fixed phase difference from one another. A detector receives illumination radiation scattered back by the surface of the object, and is superimposed with the reference radiation. The detector generates an electronic signal that corresponds to the optical interference system of the superimposed radiations, and delivers this signal to a processor. The processor is configured to determine the surface topography of the object by means of digital holography processing.

Certain additional technical measures are implemented in order to adapt the method specially to the recording of large sample volumes. These adaptations will be described in more detail below.

Very much higher light limit values may be used if the étendue of the illumination is increased significantly. This may be achieved by scattering the light wave of a fully coherent TEM00 mode at a temporally static diffusing plate. The full spatial coherence of the source remains unchanged during this scattering process, since only time-variable diffusing plates would influence the spatial coherence. For this reason, the fully coherent evaluation that is needed for digital holography is effected despite illumination with a scattered illumination wave. For the evaluation, known methods of numerical light field propagation, which are used in the prior art to evaluate the light waves scattered back by the object, are additionally applied to the propagation of the light wave from the diffusing plate into the object plane.

For surveying extended objects, so-called tracking interferometers are nowadays used (for example Leica Lasertracker, Nikon Laser Radar, Etalon Lasertracker NG). These scan the object with a focused laser wave having focal sizes of from a few to a few hundred µm in diameter. These systems typically use lasers with a wavelength of about 1.5 µm, and scan a few thousand measurement points per second. All the systems are certified in laser class 1, and therefore comply with the laser power limit value of 10 mW for continuous emission.

The holographic system described here, which operates with a degree of parallelism of a several tens of megapixels and is illuminated with a scattered wave, may conversely operate continuously with very much greater optical powers of about 400 mW, for example in the 800 nm band, without causing hazard to persons present. A speed that is at least 40 times higher is achieved, thus.

Since in certain applications a scene does not long remain unchanged at interferometric quality level, special measures are preferably taken in order to minimize the recording time for all data to be coherently calculated. Measures to compensate for residual movement artefacts are additionally possible.

The following measures, individually or in combination, are particularly preferred for rapid holographic recording.

Interferometric records of the object are created with a two-dimensionally position-resolving camera. In order to be able to ascertain the phase angle of the detection wave independently in each specimen pixel in each of these individual records, off-axis detection as is known elsewhere in the prior art, for example from DE 10 2018 130 396 A1, is preferably used. For the measurement of an absolute distance to the object, at least two images are registered at different wavelengths. The wavelength difference of the two images generates a synthetic wavelength. The phase difference of a pixel in these two images gives the phase angle of the synthetic wavelength. The wavelengths $\lambda 1$ and $\lambda 2$ are selected in such a way that the uniqueness range of the measurement corresponds to greater than or equal to the maximum wavelength to be measured. If L is two times the distance to the surface of the object, $L<\lambda 1*\lambda 2/|\lambda 2-\lambda 1|$ is required. Depending on the SNR (signal to noise ratio) of the measurement, a certain phase measurement accuracy and therefore length resolution is achieved. By averaging over a plurality of records, it is possible to increase the SNR and therefore raise the measurement accuracy. For physical reasons, it is alternatively or additionally preferred to record additional records with greater wavelength differences. Although these measurements have a correspondingly smaller uniqueness range in the separation measurement, on the other hand they have a correspondingly higher separation measurement accuracy. The wavelengths of the records are for this purpose preferably selected with exponentially increasing differences in the magnitudes of the k-vectors $(2\pi/\lambda)$. It is also preferred for the difference of each wavelength from another wavelength to occur only once in such a wavelength graduation, and for the various differences to generate as far as possible an exponentially distributed sequence of wavenumbers (magnitudes of the k-vector).

b) Only differential phase images are evaluated in the evaluation. In order to be able to reduce the movement artefacts further, the typical time constants of the movement artefacts are ascertained by recording a plurality of images successively with the same wavelength and comparing the phase values. In the recording of the wavelength sequence, images with the fixed reference wavelength, which are used only to estimate and correct the movement artefacts, are then recorded at time intervals which are tailored to these movement artefacts. It is especially preferred to record double images with a fixed reference wavelength and a wavelength from the wavelength list. If the movement artefacts already occur within the typical integration times of the individual images, of about 10 ms, the relative phase angles and their rate of change may thus be determined from the image sequence of the comparison images with the fixed reference wavelength. It is then preferred to modulate the power of the laser source to double the frequency of these phase speeds, in order to achieve a higher interference contrast in the records. Through this measure, only one phase state of the waves is illuminated at a time, in a similar way to stroboscopic recording. Preferably, the so-called global shutter cameras should be used as the detector. With these cameras, it is possible to record double records with a very short time interval of less than 10 µs. For this purpose, the camera is adjusted to the longest integration time that can be recorded with the maximum frame rate For example, just under 20 ms with 50 frames/s. After the conclusion of an integration time, the charge of each pixel is transferred very rapidly into a readout capacitor. While the camera pixels start the signal integration for the next frame after a very brief interruption of about 50 µs, the preceding image may be read out simultaneously. If the light source is now turned on only for a short time of, for example, one millisecond at the end within the active integration time of the first recording, and only for the first millisecond in the subsequent frame, two images may be recorded within only about 2.05 ms. By such a pulsed mode of operation, on the one hand the peak powers permitted by the laser limit values may be increased further, and on the other hand it is also possible to achieve measurement speeds that are much higher than the nominal frame rates of the camera. By the combination of the two measures, movement artefacts may be reduced significantly.

c) With regard to increasing the speed the minimum number of detected photons for achieving a certain depth resolution for the various methods will be compared below. In the FMCW lidar methods known from the prior art, a laser source is tuned continuously in its wavelength and the intensity of the superposition of the signal wave with a reference wave is measured. By evaluating this superimposed wave for different wavelengths using a fast Fourier transform, the depth of the object may be measured/reconstructed. The depth resolution depends on the tuning bandwidth of the laser and on the SNR of the measurement. If the tuning bandwidth is doubled for a given integration time, two times the depth resolution is achieved (i.e. halving of the standard deviation of the distance error) in the same time, but a laser with two times the tuning rate is also required. If the laser is operated at the maximum possible tuning rate, double the time is required for double the tuning bandwidth, but even a 2.8 times better depth resolution is achieved.

d) If a plurality of records are recorded, or correspondingly longer records with a particular fixed tuning bandwidth, and the depth measurement values are averaged, the depth resolution scales linearly with the SNR. This means that quadratically (4 times) longer integration times must be used in order to double the depth resolution by averaging. In digital multifrequency holography, a plurality of records are recorded with exponentially graduated wavenumbers. The resolution as a function of the maximum wavenumber difference is the same as in the FMCW method as a function of the tuning bandwidth. With each additional record or (in non-static systems), the resolution therefore increases by a certain factor of about 2 to 10 with each additional double record. For this reason, the achieved depth resolution in multifrequency holography effectively scales exponentially with the summed integration time.

This is one of the reasons, besides the higher allowed laser power due to the scattering of the illumination wave, why multifrequency holography allows much more efficient and therefore also more rapid detection, especially for very high depth resolutions in the range of from 1 to 100 μm.

Lasers with coherent lengths in the range of a few tens of meters and the possibility of being able to tune the laser frequency in certain limits are used as the laser sources. For example, ECDL (extended cavity diode laser), VCSEL, DFB or DBR Semiconductor lasers are particularly preferred.

It is preferred to use laser wavelengths for which position-resolved array sensors with a suitable resolution are available. In contrast to the commercially available tracking interferometers, it is preferred to use wavelengths in the range of from 600 to 1000 nm, which can be registered by high-resolution silicon camera detectors, particularly preferably in the range of from 700 to 900 nm.

The lasers can typically be tuned by means of the operating current very rapidly (MHz) over a range of up to one nanometer. Thermal tuning over up to about 7 nm can also be carried out with time constants in the second range.

If particularly high axial resolutions in the range of a few tens of μm are intended to be achieved, more than one laser may preferably be used in order to produce the rapid tuning within the double images.

When using two lasers, polarization coupling, intensity splitting, a dichroic superposition or a rapidly switchable superposition by means of an optical switch is preferred. Especially in the case of dichroic coupling, it is preferable to provide only that reference wavelength of one of the lasers which has the greatest wavelength difference from the other wavelengths used.

If more than one laser is intended to be used for the illumination, fiber-coupled lasers may be employed and the fibers may be arranged next to one another behind the collimating asphere. In this way, the illumination pattern behind the diffusing plate mutually differs for the various laser sources. Yet since this takes place in a defined way, it may be taken into account during the evaluation.

For digital multifrequency holography, it is important for the signal light of a pixel only to be scattered back from one depth. So that inclined object faces can be measured as well, the lateral and axial resolutions are preferably of the same order of magnitude. Each object pixel then has a defined backscattering phase, to a first approximation independent of the wavenumber.

If only two lasers are intended to be used, it is preferable to combine the lasers by means of an AWG (arrayed-waveguide grating) or optical switch and then amplify them by means of an SOA (semiconductor optical amplifier)/tapered amplifier. In this case, the illumination pattern for the various wavelengths is equal in the zero delay, and only one SOA is needed for the amplification of two lasers.

Alternatively, it is preferred to use extended cavity diode lasers in combination with a fixed-frequency laser (for example a DFB laser). Extended cavity lasers have a very long coherence length and can be tuned for very wide spectral ranges. They do however exhibit mode hops during the tuning, although these do not cause interference since images are recorded only at fixed wavelengths. Typical tuning rates lie in the range of 10 nm/s, and are therefore much slower than with typical DFB lasers. These times are acceptable for a full sweep of up to 10 nm. Yet since double images need to be recorded with a very short time spacing of a few milliseconds, an extended cavity laser is preferably combined with a fixed-frequency laser in order to be able to record double images in time periods of a few milliseconds.

The digital holography evaluation is carried out, for example, according to DE 10 2008 020 584 A1.

When reference is made to a system in this description, the corresponding comments apply similarly for a corresponding method, and vice versa.

It is understood that the features mentioned above and the features yet to be explained below may be used not only in the combinations indicated but also in other combinations or individually, without departing from the scope of the present invention.

BRIEF DESCRIPTION OF THE DRAWINGS

The invention will be explained in more detail below with the aid of exemplary embodiments with reference to the appended drawings, which likewise explain features essential to the invention. These exemplary embodiments are only illustrative and should not be construed as restrictive. For example, a description of an exemplary embodiment with a multiplicity of elements or components should not be construed as meaning that all of these elements or components are necessary for implementation. Rather, other exemplary embodiments may also contain alternative elements and components, fewer elements or components, or additional elements or components. Elements or components of different exemplary embodiments may be combined with one another, unless otherwise indicated. Modifications and variations which are described for one of the exemplary embodiments may also be applicable to other exemplary embodiments. In order to avoid repetition, elements that are the same or correspond to one another in the various figures are denoted by the same references and not explained again. In the figures:

FIG. 2 shows a light source device provided in the system of FIG. 1A or 1B.

DETAILED DESCRIPTION

Figure 1A:
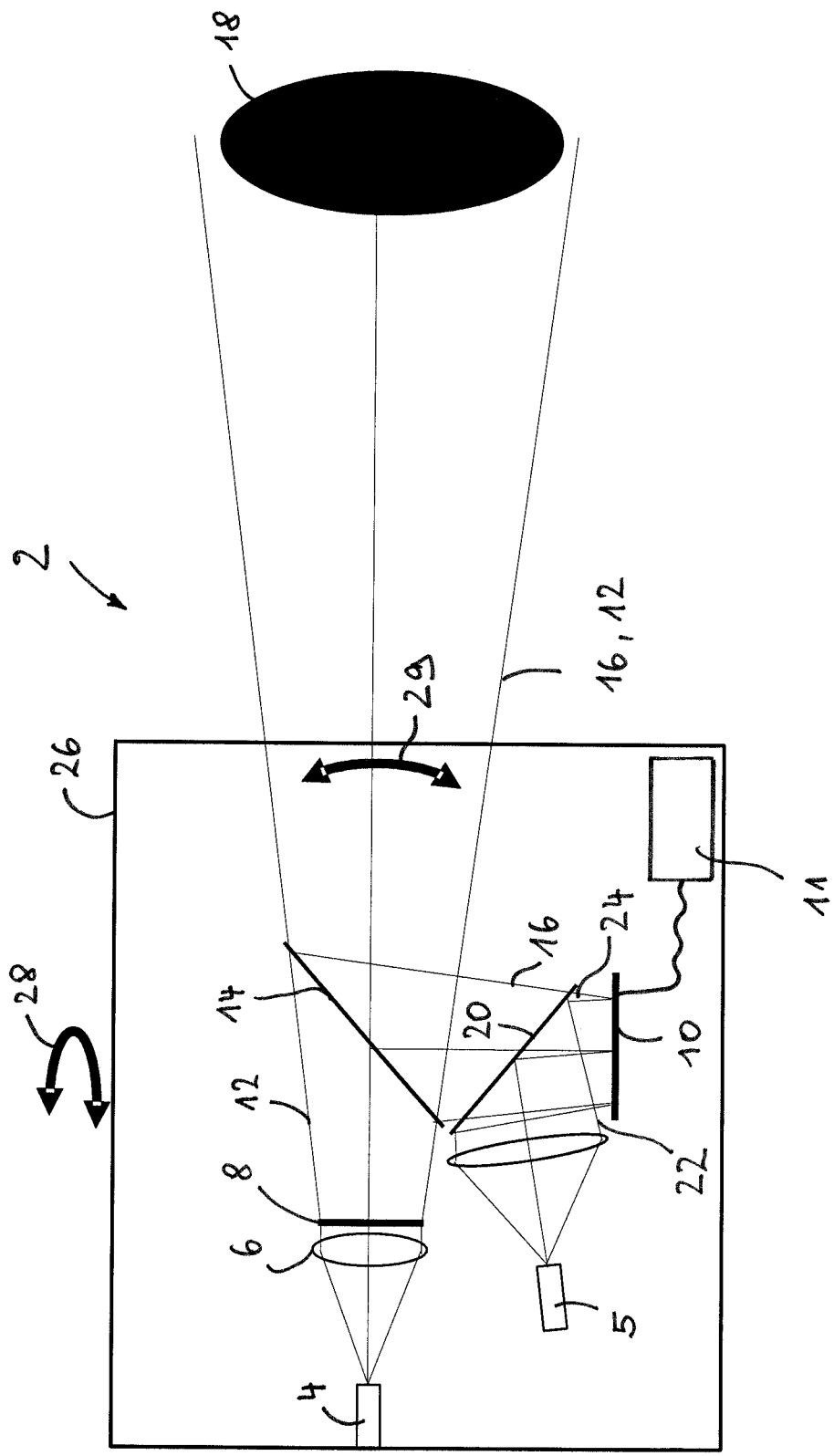
FIGS. 1A and B show diagrammatic representations of a system for surface topometry.

FIG. 1A shows a free-beam path in a schematic system 2 without lenses in the direction beam path. The light of one or more single-mode glass fibers 4 arranged close to one another is collimated with a lens 6 and illuminates a diffusing plate 8. The diffusing plate 8 may be configured as a transmissive diffusing plate. Since the scattering of the light wave is the central technical safety concept for the use of high output powers, "falling out" from the beam path could greatly increase the danger potential. For this reason, it may be technically preferred to configure the diffusing plate 8 as a reflective element. If in this case the plate falls out of its holder, light can no longer be emitted and the system is inherently safe.

The diffusing plate 8 is dimensioned in such a way that it emits an envelope in the shape of a top hat in the far-field distribution as the light field 12. The field size is adapted to the diffraction-limited resolution of the detector pixels of a detector 10, by the light distribution scattered back by the object generating speckles, which are greater than or equal to the pixel size, on the detector 10. Radiation reflected back by the surface of the object 18 is acquired by the detector 10. In this case, off-axis detection is carried out with a superimposed reference wave 22. A light wave 1b from the object and a reference wave 22 are superimposed at an angle 24 on the detector 10. In the direction of the detector 10 in which there is the angle 24, only a 3 times smaller object image field is lit. Speckles of the light distribution scattered back by the object are therefore at least 3 times larger than the detector pixel in this direction. In a lensless system, the far-field of the diffusing plate 8 fulfills a virtual field stop functionality.

Between the illumination and the detector, there is a splitter plate 14 which splits the two light fields 12, 16. For efficiency reasons, it is preferred to use polarization splitting. For this, a linear laser radiation polarization is converted into a circular polarization on the object with a λ/4 plate behind the splitter. The waves (light field 16) scattered back at the surface of the object 18 are linearly polarized again during the second pass, but rotated through 90° with respect to the laser polarization direction, and are therefore reflected with a high efficiency from the splitter 14 to the detector 10.

On the detection side, the reference wave 22 with the same polarization state as that of the signal wave 16 is superimposed at an off-axis angle 24 with a second intensity splitter 20 that is as polarization-independent as possible. It comes from one of the light guide fibers 5.

A control and evaluation device, comprising inter alia a processor 11 and a memory, reads inter alia the signals of the detector 10 and carries out the signal evaluation for the digital holography, for example according to DE 10 2008 020 584 A1.

Preferably no imaging optics such as lenses, which would produce imaging, are arranged between the diffusing plate 8 and the surface of the object 18 that is to be acquired, and/or also between the surface of the object 18 and the detector 10. The imaging of the object is carried out exclusively digitally by the evaluation. The advantage is that the system is free of optical aberrations and reflections.

Imaging optics may be used in the detection and illumination beam path. The size of the acquired image field and the lateral resolution thereby achievable may then be adapted to various application measurement tasks by means of the focal length of an objective arranged between the beam splitter 14 and the objective 18.

In order to be able to measure the topography in relatively large object fields as well, the entire measurement head 26 of the system 2 can preferably be swiveled and inclined (arrows 28, 29) in a motorized fashion by means of a drive (not represented). From position-resolved separation measurement data together with the very precisely ascertainable swivel and inclination angles, the topography of a scene may then be recorded with high precision up to a 360° angle.

The imaging of the diffusing plate 8 onto the object 18 and the imaging of the object 18 onto the detector 10 are fully symmetrical. With lensless illumination and detection, this is automatically the case. In systems with lenses imaging systems with the same effect are preferably used in the illumination and detection. If a detection lens is configured in such a way that it can be refocused in a motorized fashion onto the average object separation, the illumination optics should also be refocusable in the same way. In systems with lenses, it may therefore be preferred to use the same objects in the illumination and detection beam paths. Under these circumstances, the reflections in the optics will be reduced as far as possible in order not to interfere with the evaluation. This may, for example, be achieved by only placing the λ/4 plate behind the last optical objective face on the object side, because in this way all reflections from the object are suppressed from the detection because of their polarization state. If this polarization reflection suppression does not allow a sufficient degree of suppression, the optics may be configured to be internally reflection-free. For this purpose, "reflection-free" mirror optics may be used. It is furthermore possible to arrange refractive or diffractive optical elements tilted in the beam path in such a way that their back-reflections geometrically cannot impinge on the sensor.

One great advantage over conventional optical systems is the possibility of digitally-optically correcting known optical aberrations. In this way, optics may be optimized here for minimal reflections and a high image quantity may subsequently be achieved by the evaluation.

It is, however, also possible to use separate conventional optics affected by reflections for the illumination and detection, and only to superpose the beam paths after the last optical face.

FIG. 1B shows the variant with an objective 23 and a λ/4 plate 25 arranged in front of this object 18, both arranged inclined in order to minimize reflections.

FIG. 2 shows the fiber part of the illumination laser system 2 of FIG. 1A or 1B with two separate laser sources 30, 32.

In the structure represented in FIG. 2, fiber coupled DFB lasers are particularly preferred. From the beams of the two lasers 30, 32, a small part of the intensity (for example 20%) is split off with splitters 34, 36 and used for a very accurate wavelength characterization in a k-clock unit 38, which determines the wavenumbers (k-values). If DFB lasers are used, the frequencies of the laser beams may drift, for example during the tuning of the frequency, due to electro-optical thermal transient processes and cause a significantly reduced coherence length of the emitted radiation. It is therefore preferred to characterize the laser beams accurately and, for example, to compensate for the thermal transient processes by readjustment of the operating current in such a way that the coherence length is sufficiently long during the measurement time and the frequency does not drift If these measures alone are not sufficient, it is preferred as represented in FIG. 2 to make the lasers emit continuously and to be able to switch onto the output fiber 42 by means of an optical switch 40. In this case, the switch 40 performs switching of the laser frequencies within a double image. The pulses of the lasers 30, 32 will in this case be produced by an optical post-amplifier 44, which together with a synchronized detector 10 allows timing within the double image.

After the amplifier 44 (if the latter is used) or from the fiber 42 (without an amplifier), the radiation travels in the design of FIG. 1A or 1B into the fibers 4 and 5 via a suitable splitter.

Figure 3:
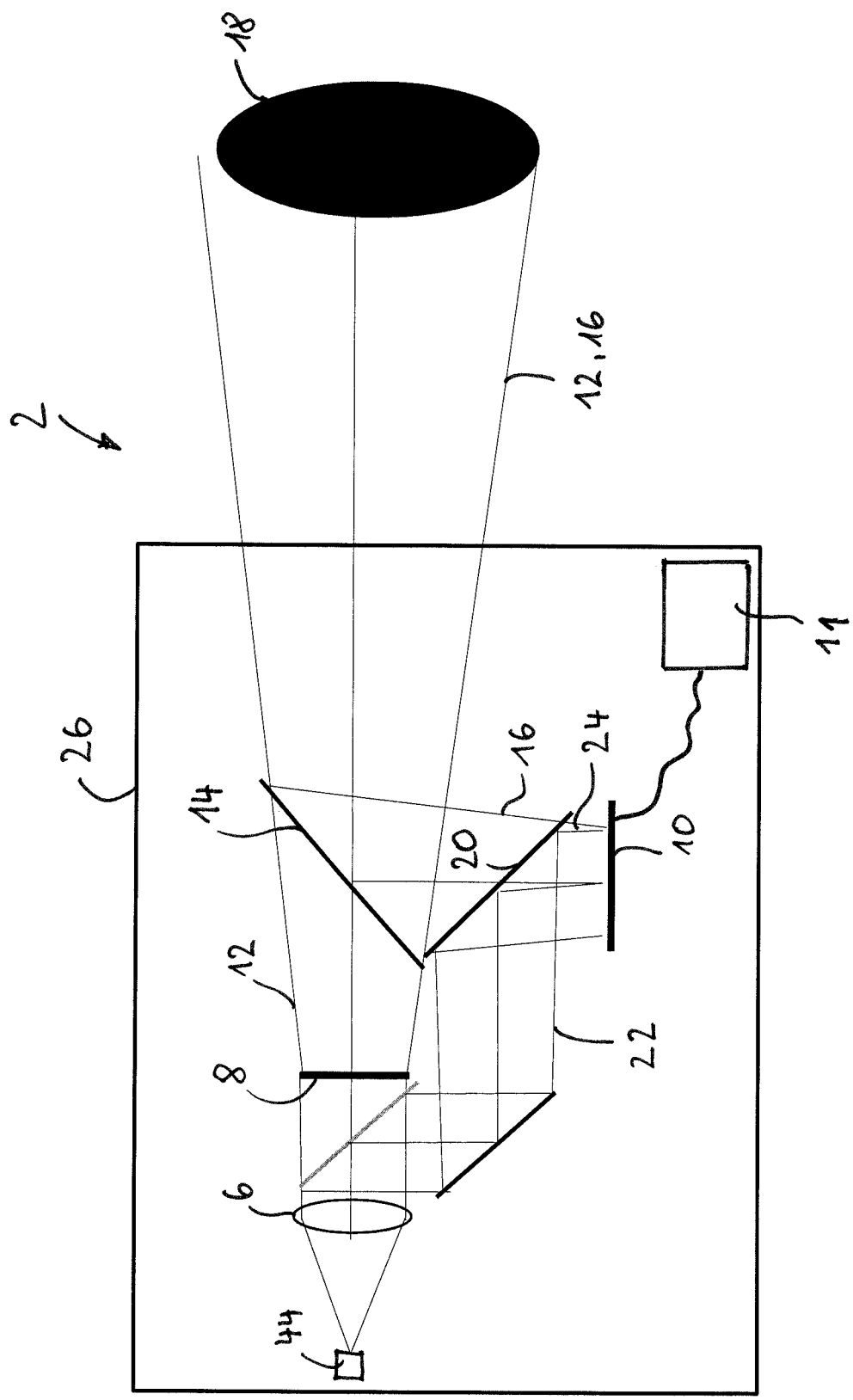
FIG. 3 shows a variant of the system of FIG. 1A or 1B, and FIGS. 4-7 show embodiments of a unit provided in the system in order to measure wavenumbers (k-values).

Since the emitted light wave field has a very large étendue because of the diffusing plate, optical powers in the range of from 100 mW to 10 W may be emitted safely (as laser class 1) by the system 2 as a function of the image field size. In order to amplify the power of the lasers 30, 32 into this order of magnitude, a tapered amplifier is particularly preferably used as the amplifier 44. The latter is characterized in that the emitted power is so large that sometimes it can no longer be guided by single-mode fibers. Under certain circumstances, it is therefore preferred to cleave the reference wave between the collimator and the diffusing plate in a free-beam construction, as is represented in FIG. 3. In other regards, the system 2 of FIG. 3 corresponds in respect of illumination and detection to that of FIG. 1A or 1B.

For the method, it is essential that the exact wavelengths of the double images are known with very high precision (to 10 m·1E−6 at 10 μm). DFB lasers, which may be tuned by means of the operating current and the chip temperature, or ECDL lasers, which may additionally be tuned by the alignment of the external fiber grating, are preferably used as the laser sources 30, 32. Each laser 30, 32 is measured in calibration at all possible operating states and, if possible, stored in a parameterized fashion in a lookup table. It is therefore possible to specify the laser with a certain accuracy in its emission wavelength. For the accuracies required here, an additional high-accuracy wavelength measurement by means of the k-clock 38 is preferably used. For this purpose, a part of the intensity of the laser is split off (34, 36) and a two-beam interference is measured in a fiber interferometer, referred to here as a k-clock 38. The length of the k-clock is oriented, in precisely the same way as the actual measurement of the section, by its uniqueness range for the wavelength of measurement, which is contingent on the accuracy of the laser wavelength prediction with the calibration lookup table. If the fundamental wavelength of the laser is known only very insufficiently but at the same time a very high depth resolution is intended to be achieved in the depth measurement, it is preferable to operate with at least two k-clock interferometers of different lengths. The lengths of the k-clock interferometers are matched in such a way that the measurement accuracy of the short k-clock is reliably less than the uniqueness range of the next more accurate k-clock. It is preferred to measure the wavelengths of the two lasers 30, 32 continuously, independently of the switch 40 and the post-amplifier 44.

As represented in FIG. 4, Michelson fiber interferometers may be used as fiber interferometers for the k-clock. This fiber interferometer decouples radiation of the laser 30 or 32 by means of a beam splitter 48, 50 and has a reference fiber 52, 54, which ends in a fiber reflector 56, 58 and thus guides the reference radiation via the beam splitter 48, 50 to a detector 60, 62. The signal output by the detector 60, 62, which corresponds to the optical intensity signal, depends on the wavelength and therefore the k-number of the radiation output by the laser 30, 32, since each k-clock 45, 46 additionally comprises a further measurement branch 64, 66 that ends in a fiber reflector 68, 70. It is also possible to use Mach-Zehnder interferometers or Fabry-Pérot interferometers, as is known in the prior art.

The precise optical path length within the k-clock interferometer 45, 46 gives the absolute location of the wavelengths. Because of thermal expansions or a thermal refractive index change within the k-clock fibers, deviations may be caused between the absolute location of the two laser wavelengths. It is therefore preferred to arrange the k-clock fibers close together in a thermally regulated environment in order to achieve very accurate distance measurements.

Alternatively, it is also possible to use a common delay fiber 76 for both k-clock measurements, as is represented by way of example in FIG. 5. The Bragg reflector 72 is configured in such a way that it has a reflectivity of about 10% for the wavelength of the laser 30 and a reflectivity of 100% for the wavelength of the laser 32. The Bragg reflector 74 has a reflectivity of 10% for the wavelength of the laser 32 and 100% for the wavelength of the laser 30 (and vice versa). This ensures that no light of the laser 30 can impinge on the k-clock 46, and the measurements of the two laser wavelengths are mutually independent.

For achieving very high measurement accuracies, besides the laser wavelength, the refractive index of the measurement room air also has an influence. This depends on a certain extent on the temperature, the air pressure, the air humidity and possibly further trace gases, for example $CO_2$. In tracking interferometers according to the prior art, measurement sensors that measure these parameters of the air and take them into account in the evaluation of the length are therefore produced. As an alternative to this solution, for very high depth resolutions it is preferred to configure one (preferably the longest) or both k-clocks 45, 46 as a free-beam cavity which is located in the same measurement room air (the room area through which the imaging beam path extends). The geometrical length of the k-clock 45, 46 must in this case vary as little as possible with the temperature, for which reason it is preferably made from materials with a very low expansion coefficient, such as Zerodur or ULE glass. Designs for such very folded free-beam cavities are known in the prior art. Reference is made to DE 19522263 A1.

Figure 6:
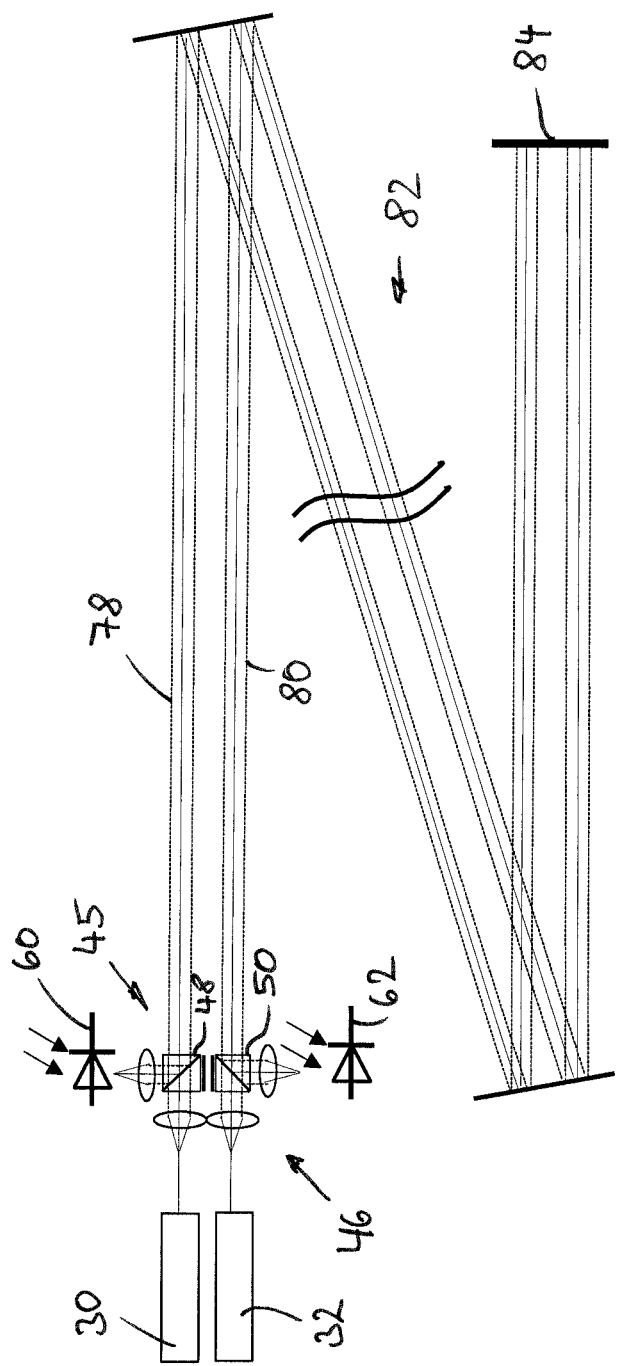
Figure 7:
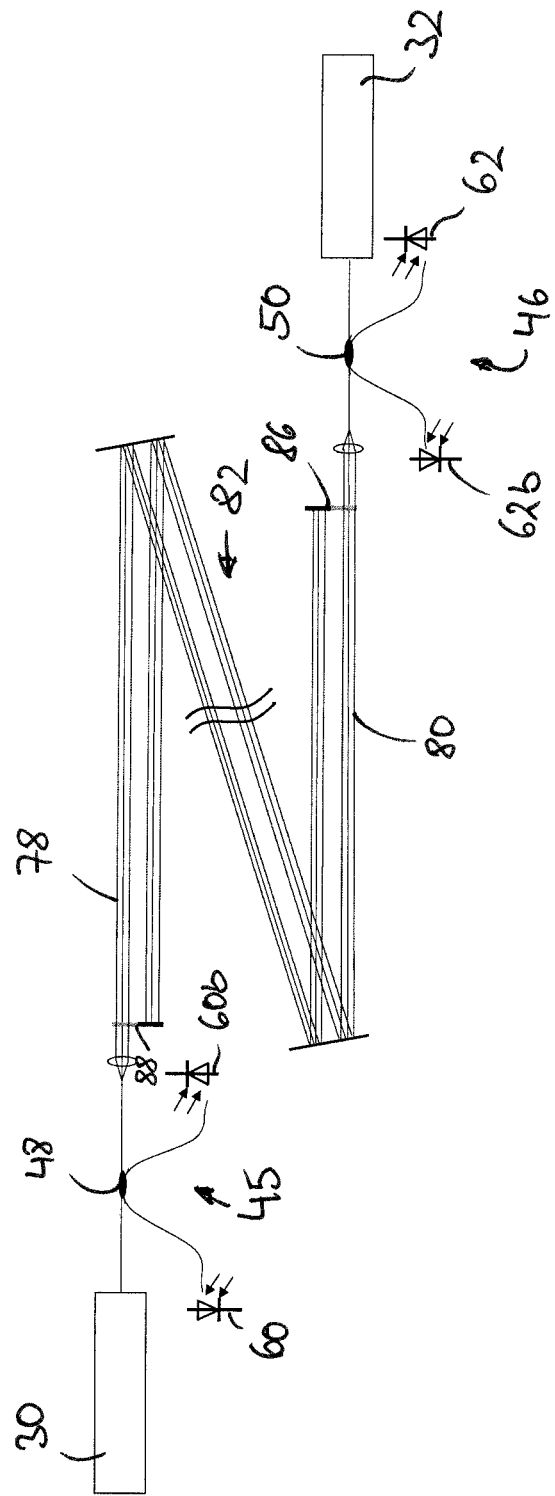

In order to be able to produce two free-beam beam paths 78, 80 close to one another for the two laser wavelengths, as shown in FIG. 6 it is possible to shine from a common side into a free-beam delay section 82 that ends in a reflector 84 for both free-beam paths 78, 80. For reasons of buildability, however, it may be preferred as represented in FIG. 7 to shine from both sides into a delay section 82 that comprises two partial mirrors 86, 88.

With the construction represented, it is also possible to record a plurality of record stacks of an image field, the measurement head 26 displacing the image field by a very small angle (for example one speckle grain) between the records. In this way, between 4 and 100 images of the image field may be recorded. Because of the displacement of the illumination field by one speckle grain, the records contain additional information items, which may be taken into account in the evaluation and allow special evaluation modes. Normally, images that are measured with a digital holography system in back-scattering are always fully speckled. These speckles always give sample regions that back-scatter no signal or whose signal is so weak that only a small depth resolution is possible, or for example that the graduation of the wavelengths could also lead to modulo 2pi errors. This effect may in principle be reduced by a plausibility comparison with neighboring pixels, although there are problems especially at object edges. If on the other hand a plurality of slightly offset records are made with scattered illumination and averaged, the records may be "despeckled". For such image records, it is preferred to record a plurality of images during a continuous scan movement of the measurement head 26 and to take the movement into account during the digital evaluation of the images.

With the structured illumination methods known from microscopy, the speckle structures of the scattered illumination may be considered as structuring and the images may be calculated in such a way that two times the lateral resolution is achievable. The lateral resolution is in this case given not only by the detection angle spectrum but, in a similar way, by the illumination angle spectrum.

For certain specimens, the situation may also occur that, at inclined parts of the surface of the object 18, light is reflected at a grazing angle in such a way that it illuminates other parts of the specimen within the image field and may vitiate the separation measurement signal of these regions because of the longer path length traveled. This effect is referred to in OCT as multiple scattering, and generates ghost images. By the structured illumination with the scattered wave and the knowledge of the complex excitation field strength at each object point, with a plurality of slightly displaced images it is now possible to distinguish between simply back-scattered and multiply scattered signal components, and thus to suppress the ghost images. Algorithms for this evaluation are described in the prior art, for example DE 10 2018 130 396 A1.

Parts may preferably be configured as a photonic integrated circuit (PIC). In particular, the following components are suitable for this: lasers, photodiodes, amplifiers, beam splitters, beam combiners, delay paths, (Bragg) reflectors, arrayed waveguide gratings (AWGs).

The invention claimed is:

1. A method for measuring a surface topography of an object, the method including the following steps:
   a) providing source radiation and splitting the source radiation into illumination radiation and reference radiation,
   b) illuminating the surface of the object with the illumination radiation at a two-dimensionally extended illumination field, the surface of the object being illuminated simultaneously with more than one spatial radiation mode, and radiation modes of the illumination being spatially and temporally coherent but having a fixed phase difference from one another, and
   c) superimposing illumination radiation scattered back at the surface of the object with the reference radiation, and detecting an interference signal of the superimposed radiations with at least one detector,
   wherein steps a) to c) are carried out for at least two different fixed wavelengths and the surface topography of the object is determined by of holography evaluation.

2. The method as claimed in claim 1 wherein the surface of the object is non-transparent to the source radiation.

3. The method as claimed in claim 1, wherein the illumination field has an extent of at least 20 cm at the object.

4. The method as claimed in claim 1, wherein the illumination radiation is generated by illuminating a diffusing plate or a scattering reflector, and no imaging optics are arranged between the diffusing plate or the scattering reflector and the object.

5. The method as claimed in claim 1, wherein no imaging optics are arranged between the object and the detector.

6. The method as claimed in claim 1, wherein optics are arranged between the detector and the object, which optics serve for illumination and for collection of back-scattered illumination radiation.

7. The method as claimed in claim 1, wherein the detector comprises detector elements lying next to one another, a number of detector elements and a number of illumination modes being matched to one another.

8. The method as claimed in claim 1, further including taking a plurality of individual image frames by detecting the interference signal of the superimposed radiations with the detector, wherein the illumination is mutually displaced by at least one illumination speckle grain between the individual image frames, and wherein the individual image frames are combined to form an overall image.

9. The method as claimed in claim 1, wherein a detector head is swiveled and/or inclined continuously and a plurality of individual image frames are recorded during the continuous swiveling and/or inclination, the movement of the detector head being taken into account in the digital holography evaluation.

10. The method as claimed in claim 1, wherein the object is illuminated with a speckle pattern that does not have a symmetry axis.

11. The method as claimed in claim 1, wherein the k-number of the source radiation is measured with an interferometer.

12. A system for measuring a surface topography of an object, comprising:
   an illumination device for providing source radiation at least at two different and fixed wavelengths,
   a splitting element for splitting the source radiation into illumination radiation and reference radiation,
   a scattering element through which the illumination radiation passes, the radiation having traveled through the scattering element providing a two-dimensionally extended illumination field, which comprises more than one spatial radiation mode, for illuminating the object, the radiation modes being spatially and temporally coherent with one another but having a fixed phase difference from one another,
   a processor,
   a detector, which receives illumination radiation scattered back from the surface of the object superimposed with the reference radiation, and generates an interference signal of the superimposed radiations and delivers this interference signal to the processor,
   wherein the processor is configured to determine the surface topography of the object by means of digital holography evaluation.

13. The system as claimed in claim 12, wherein the illumination field has an extent of at least 20 cm at the object.

14. The system as claimed in claim 12, wherein the scattering element comprises a diffusing plate or a scattering reflector, and that no imaging optics are arranged between the diffusing plate or scattering reflector and the object.

15. The system as claimed in claim 12, wherein no imaging optics are arranged between the object and the detector.

16. The system as claimed in claim 12, wherein an optics unit is arranged between the detector and the object, which optics unit serves for illumination and for collection of back-scattered illumination radiation.

17. The system as claimed in claim 12, wherein the object is illuminated with a speckle pattern that does not have a symmetry axis.

18. The system as claimed in claim 12, further comprising an interferometer for measuring the wavenumber of the source radiation.

19. The system as claimed in claim 12, wherein the detector comprises a two-dimensionally extended detector.

20. The system as claimed in claim 12, wherein the scattering element lies in a plane conjugate with the detector plane.

21. The system as claimed in claim 12, wherein parts, in particular at least one of the following component devices: lasers, photodiodes, optical amplifier, beam splitter, beam combiner, delay path, reflector, Bragg reflector, arrayed waveguide grating, are configured as a photonic integrated circuit.

22. The method as claimed in claim 6, wherein the optics are configured for reflection reduction as mirror optics or lens optics having tilted faces.

23. The method as claimed in claim 9, wherein the individual image frames are combined to form an overall image by averaging or by setting up and solving a system of equations by means of linear regression.

24. The system as claimed in claim 18, wherein the optics unit is configured for reflection reduction as mirror optics or lens optics with tilted faces.

25. The system as claimed in claim 22, wherein the detector has from 2 to 100 detector elements.

26. The system as claimed in claim 22, wherein the detector is configured as a photonic integrated circuit.

* * * * *